Figure 1:
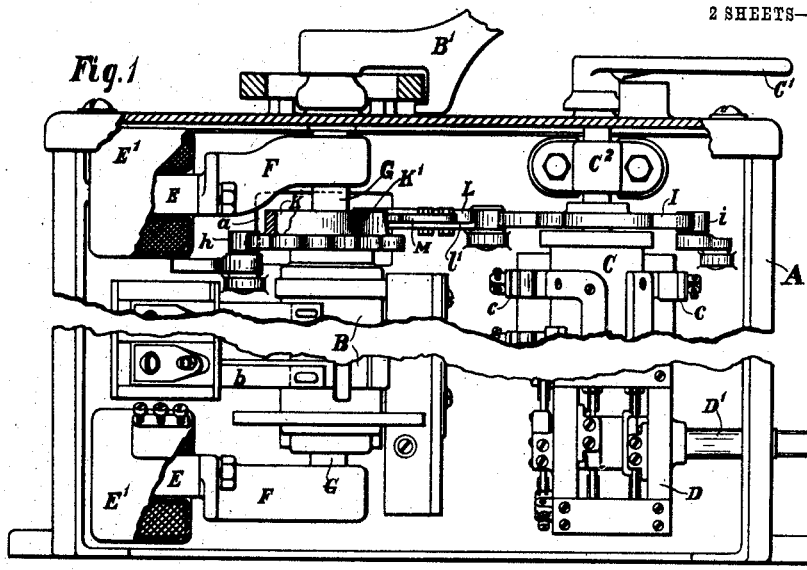

No. 874,638. PATENTED DEC. 24, 1907.
E. W. STULL.
CONTROLLER.
APPLICATION FILED MAY 3, 1906.

2 SHEETS—SHEET 1.

WITNESSES
Oliver W. Sharman
Fred J. Kinsey

INVENTOR
Emmett W. Stull
BY
Chas. E. Lord
ATTORNEY

No. 874,638. PATENTED DEC. 24, 1907.
E. W. STULL.
CONTROLLER.
APPLICATION FILED MAY 3, 1906.
2 SHEETS—SHEET 2.
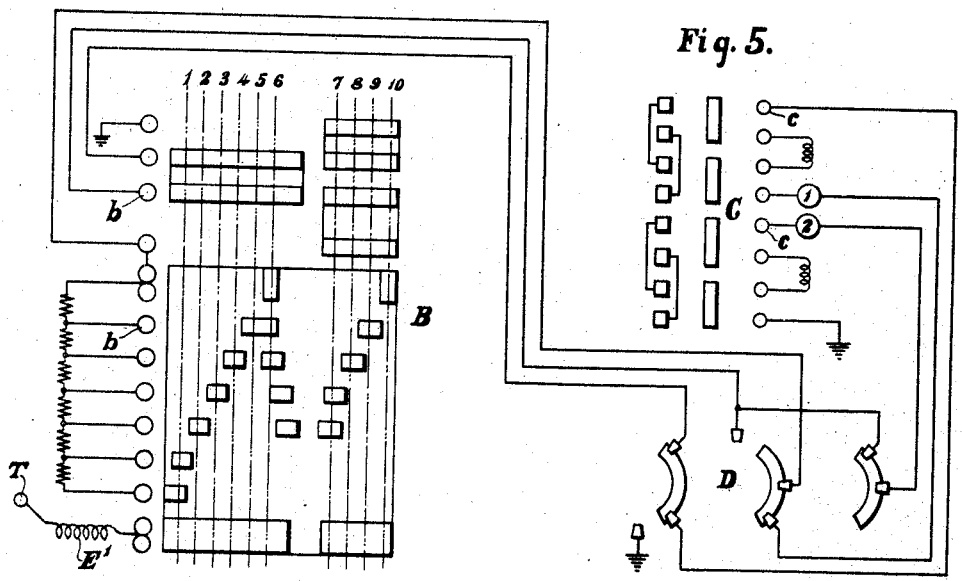
Fig. 5.
Fig. 6.
Both Motors Connected
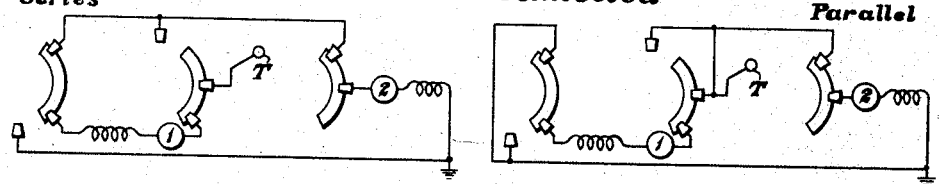
Motor No. 1 Cut Out
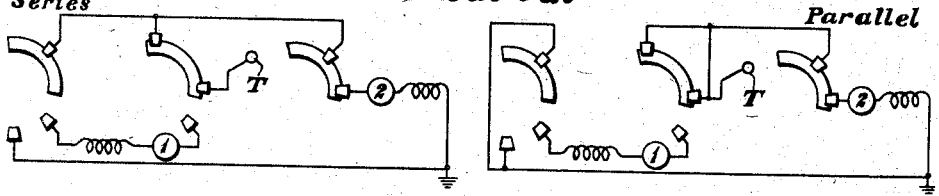
Motor No. 2 Cut Out
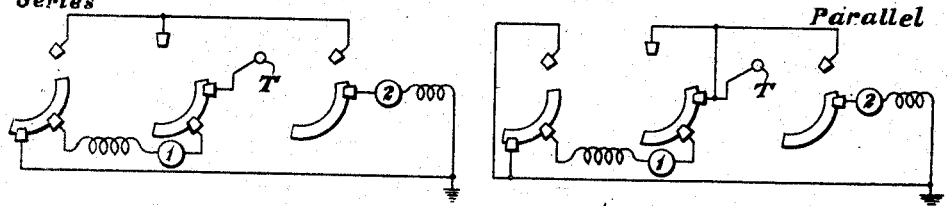
WITNESSES
Oliver W. Harman
Fred J. Kinsey
INVENTOR
Emmett W. Stull
BY
Chas. E. Lord
ATTORNEY

UNITED STATES PATENT OFFICE.

EMMETT W. STULL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

CONTROLLER.

No. 874,638.

Specification of Letters Patent.

Patented Dec. 24, 1907.

Application filed May 3, 1906. Serial No. 314,919.

*To all whom it may concern:*

Be it known that I, EMMETT W. STULL, citizen of the United States, residing at Norwood, in the county of Hamilton and State of Ohio, have invented certain new and useful Improvements in Controllers, of which the following is a full, clear, and exact specification.

My invention relates to controllers for electric motors and particularly to "series-parallel" railway motor controllers.

One of the objects of my invention is to enable an injured or disabled motor to be cut out of circuit without interfering with the regulation of the remaining motor or motors by the controller in all positions of the latter. Heretofore, when a motor was injured and was therefore cut out, the remaining motor or motors could only be operated in certain positions of the controller, there being a positive lock to prevent movement of the controller beyond certain positions at that time because if the controller should go beyond those positions there was danger either of opening some necessary circuit or of causing a short-circuit. With my cut-out switch these dangers are avoided and the uninjured motor or motors are put under rheostatic control of the controller in all positions of the latter with absolute safety.

Another object of my invention is to provide a novel interlock between the main controlling drum and the reversing switch so that it will be impossible for an ignorant or careless operator to reverse the motors while current is flowing through the motor circuits.

In one of its aspects my invention consists of a controller for a plurality of electric motors, comprising a controlling switch, a reversing switch, and a cut-out switch so connected and arranged that any single motor may be cut out without interfering with the control of any other motor through all positions of the controlling switch.

In a more specific aspect my invention consists of the combination of two electric motors, a controlling switch therefor whereby the motors may be connected in series and in parallel, a reversing switch for the motors, and a cut-out switch by means of which either motor may be cut out and the other motor so connected to the controlling switch that in all its positions the latter may control said other motor.

In another aspect my invention consists of the combination of a controlling drum, a reversing switch, and a magnetically operated interlock between the controlling drum and the reversing switch.

More specifically, my invention consists of the combination of a controlling drum, an iron shaft therefor, an iron notch plate on said shaft, a blowout magnet having the shaft as part of its magnetic circuit, a reversing switch, and an iron lever operated by magnetic leakage from the shaft and notch plate to lock the reversing switch when the blowout magnet is energized.

Other features of my invention will appear in the following description and accompanying drawings and will be particularly pointed out in the appended claims.

Figures 3, 4:
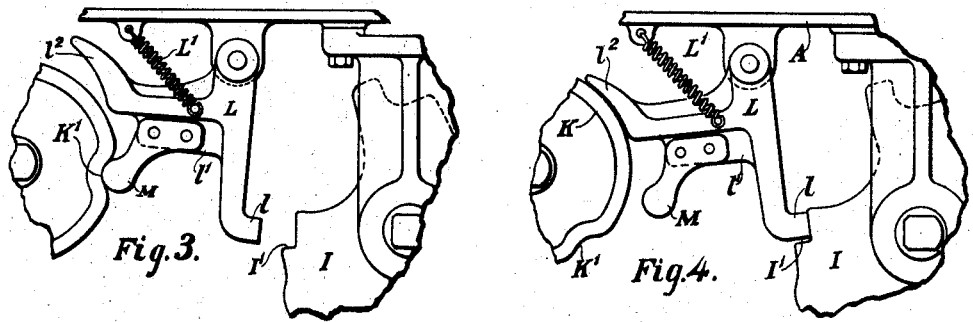
Figure 2:
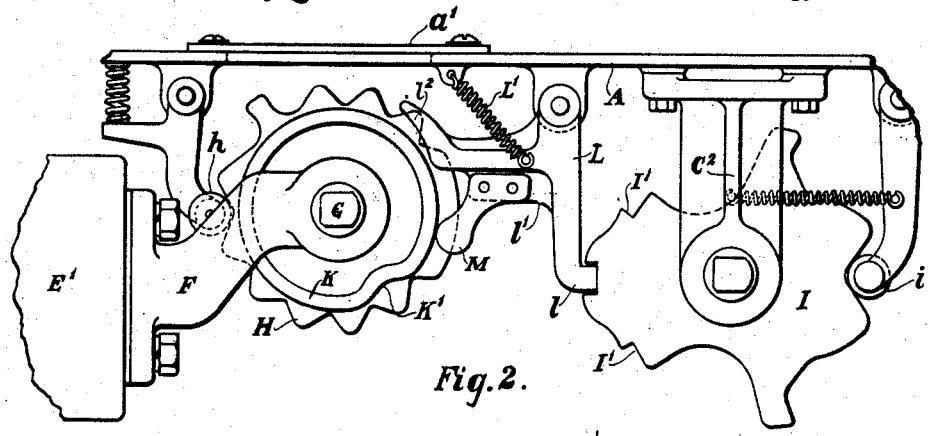

Figure 1 is an elevation of a controller, partly broken away and with the front part of the casing removed, showing my improved interlocking device. Fig. 2 is a plan view of the controller of Fig. 1 with the cover and operating handles removed, and part of the casing broken away. Figs. 3 and 4 are partial plan views similar to Fig. 2, but with certain parts broken away to more clearly show the operation of the interlocking mechanism. Fig. 5 is a diagram of the connections of my controller. Fig. 6 is a set of simple connection diagrams showing the motor connections for the different positions of the cut-out switch in the series and parallel positions of the controller.

In the drawings A is the controlling casing in which are mounted a "series-parallel" controlling drum or regulating switch B, a reversing switch C and a cut-out switch D. The controlling drum and reversing switch have coöperating contact fingers $b$ and $c$ and are operated by the removable handles B′ and C′ respectively, the cut-out switch being also preferably arranged to be operated by the handle C′ of the reversing switch. The reversing switch is mounted in bearings C². The controlling drum B and the reversing switch C may be of any desired construction.

Cores E of blowout magnets E′ extend from the casing and are preferably integral with it. Extensions F of the cores E are bolted or otherwise fastened to said cores and serve as bearings for the shaft G of the controlling drum. The parts A, E, F and G, are all of iron or other magnetic material, and form parts of the blowout magnetic circuit. The magnetic circuit may be completed in any desired manner, for instance as set forth in my co-pending application Serial No. 309,027 filed March 31, 1906, but as this forms no part of my present invention it will not be specifically shown or described. Other ways of completing the magnetic circuit may be used. It is not necessary to have the controller shaft mounted in core extensions of the blowout magnets nor is it necessary to have two blowout coils. It is only necessary that the controller shaft and controller casing form parts of a magnetic circuit, preferably of the blowout magnetic circuit, and this may be accomplished in any desired manner. The blowout coils E' may be connected as desired, but are preferably connected in series with the motors as shown diagrammatically in Fig. 5.

Mounted on the shafts of the controlling drum and reversing switch are notch plates or star wheels H and I respectively, with which coact the usual spring pressed pawl rollers $h$ and $i$. Extending upwardly from and preferably integral with the star wheel H is a ring K provided with a notch K'. The upper edge of this ring is preferably in the same plane as the upper surface of notch plate I. Pivoted to the casing A is a bell-crank lever L drawn to the left by a spring L'. This lever has the end of one arm bent at right angles to form a finger $l$ which is arranged to engage with the notches I' of the notch plate I under certain conditions. The other arm of the lever L extends towards the ring K and at its end is formed into a shoe $l^2$ shaped to fit the ring K. The notch plates H and I, the ring K and the lever L are all of magnetic material, such as iron. Between the two arms of the bell-crank lever is a shelf $l'$ to which is bolted a brass pawl M.

When the controlling drum is in "off" position, the pawl M rests in the notch K' of the ring K, as shown diagrammatically in Fig. 3. The reversing switch is now free to move to any of its three positions, "ahead", "neutral", or "back". If the reversing switch is in neutral position and the controlling drum is moved out of "off" position, the pawl M rides on ring K, leaving notch K', and thus the bell-crank lever L is moved to the right and the finger $l$ seats itself in the middle notch I' as shown in Fig. 2. The reversing switch is now locked against movement to either "ahead" or "back" position and the motor circuits being broken at the reversing switch, the motors are not started although the controlling drum is in an "on" position. If, however, the reversing switch is in either "ahead" or "back" position, and the controller drum is moved out of "off" position, current flows through the controller, the blowout magnet and the motors. The blowout magnet thus being energized, the shaft G, notch plates H and ring K are magnetized and the shoe $l^2$ is attracted toward the ring K by magnetic leakage from the main blowout magnetic circuit. This movement of the lever L causes the finger $l$ to be seated in one of the outer notches I' of notch plate I as shown in Fig 4, thus locking the reversing switch against movement. The shoe $l^2$ does not quite engage the ring K because the finger $l$ is made long enough to strike the bottom of notch I' before such engagement takes place. Thus friction in turning the controller drum is avoided. The depth of the middle notch I' might be such that when finger $l$ is seated therein, arm L is not far enough to the right to allow pawl M to leave notch K'. With such an arrangement the controller drum could not be rotated with the reversing switch in neutral position.

In order to lessen magnetic leakage directly between the notch plate H or ring K, and the casing A, said casing may have a hole $a$ directly back of the notch plate and ring, and, if desired, this hole may be covered with a plate $a'$ of brass or other non-magnetic material.

The cut-out switch D is preferably constructed as fully shown and described in my co-pending application Serial No. 309,026 filed March 31, 1906, but as such structure is no part of my present invention a detailed description of it will not be given here. This cut-out switch consists of three blades mounted on a shaft D' and arranged to be moved into three positions. Its connections are here especially designed for a controller for two series motors 1 and 2, but obviously a plurality of motors in parallel might be substituted for each single motor. In the middle position of the cut-out switch, both motors are connected, while in either extreme position, one motor only is connected.

The complete electrical connections of my controller and cut-out switch are shown diagrammatically in Fig. 5. In positions 1 to 6 inclusive of the controlling drum the motors are connected in series, and in positions 7 to 10 inclusive, they are in parallel. If, however, one motor or the other were disabled it would be dangerous to use the controller unless that motor were completely cut-out. This I accomplish by my cut-out switch which when cutting out either motor so connects the remaining motor that it may be safely controlled through all positions of the controller.

The row of diagrams at the left of Fig. 6 show in simple form the connections of the cut-out switch controller in its series positions, and the corresponding diagrams at the right show the connections for the same positions of the cut-out switch with the controller in its parallel positions. In these diagrams the trolley T is shown in the center of the figure to avoid confusion from crossing of wires. When the cut-out switch is in its middle or normal position, both motors are connected and the controller has its normal series-parallel control of the motors, as shown in Fig. 5 and more simply in the upper diagrams of Fig. 6. If it is desired to cut out motor 1, the cut-out switch is moved into its upper position, as shown in the middle diagrams of Fig. 6, thus completely disconnecting motor 1 and making such connections that the remaining motor 2 is put under rheostatic control of the controller through all positions of the latter. If it is desired to cut out motor 2, the cut-out switch is moved into its lower position, as shown in the lower diagrams of Fig. 6, thus completely disconnecting the motor 2 save for its ground connection, and making such connections that the other motor 1 is put under rheostatic control of the controller through all positions of the latter. By the operation of this cut-out switch no part of a motor which is cut out is connected to the trolley, and thus no short-circuit through a grounded motor can occur. Obviously the permaı.ent ground connection of motor 2 can cause no harm. Thus when my cut-out switch is operated to cut out either motor the controller may safely be moved to any and all of its positions in regulating the remaining motor.

Although I have shown and described my invention in the particular form which I now prefer, I do not wish to be limited to the precise structure shown and described, for many changes may be made in the construction of the various parts without departing from the broad spirit of my invention, and all of these obvious modifications are intended to be covered by my claims.

What I claim as new and desire to secure by Letters Patent is:—

1. In a controller, a controlling drum, a reversing switch, and a magnetically operated interlock between the controlling drum and the reversing switch.

2. In a controller, a controlling drum, a reversing switch, a blowout magnet, and an interlocking device between the controlling drum and the reversing switch, operated by the blowout magnet.

3. In a controller, a controlling drum, a reversing switch, and a magnetically operated device for locking the reversing switch against movement whenever current is flowing through the controller.

4. In a controller, a controlling drum, a reversing switch, a blowout magnet, and a device operated by the blowout magnet for locking the reversing switch in whatever position it may be when the blowout magnet is energized.

5. In a controller, a controlling drum, a reversing switch, a locking device for the reversing switch, and a blowout magnet which also operates said locking device.

6. In a controller, a controlling drum, a reversing switch having three positions, and means operative when the controlling drum is not in "off" position for magnetically locking the reversing switch if it is in either "on" position, and for mechanically locking it if it is in neutral position.

7. In a controller, a controlling drum, a reversing switch having three positions, and means operative when the controlling drum is in any "on" position for magnetically locking the reversing switch in whatever position it may have, if current is flowing through the controller, and for mechanically preventing the reversing switch from movement into another position if current is not flowing through the controller.

8. A controlling device for electric motors comprising a regulating switch, a reversing switch, a blowout magnet, and a device operated by the blowout magnet when the latter is energized for locking the reversing switch against movement.

9. In a controlling device for electric motors in which separate switches are employed for regulating and reversing, the combination with said switches of a magnetically operated interlocking device between the two switches.

10. In a controller for electric motors, a regulating switch, a reversing switch, and magnetically operated means for locking the reversing switch when current is supplied from the line to the motor or motors through the controller.

11. In a controller, a controlling drum, a reversing switch, an iron ring on the shaft of the controlling drum, a notch plate on the shaft of the reversing switch, an iron lever coacting with the ring and the notch plate, and a coil which when energized magnetizes the ring, the latter thereby attracting one end of the lever, thus causing the other end thereof to engage the notch plate and lock the reversing switch against movement.

12. In a controller, a controlling drum having a shaft, an iron disk on said shaft, a reversing switch, an iron lever coacting with the disk and reversing switch, and a coil which when energized magnetizes the disk, thus causing it to attract the lever, the lever by its movement locking the reversing switch.

13. In a controller, a controlling drum, a reversing switch, a blowout magnet, and a locking device for the reversing switch operated by magnetic leakage from the magnetic blowout circuit.

14. In a controller, a controlling drum, an iron shaft therefor, a blowout magnet having the shaft as part of its magnetic circuit, a reversing switch, and an iron locking lever for the reversing switch actuated by magnetic leakage from the shaft to lock said reversing switch when the blowout magnet is energized.

15. In a controller, a controlling drum, an iron shaft therefor, an iron notch plate on said shaft, a blowout magnet having the shaft as part of its magnetic circuit, a reversing switch, and an iron lever operated by magnetic leakage from the shaft and notch plate to lock the reversing switch when the blowout magnet is energized.

16. A two motor controller, comprising a controlling drum having series and parallel positions, a reversing switch, and a unitary cut-out switch for cutting out either motor while still permitting the other motor to be controlled by the controlling drum through all positions of the latter.

17. A two motor controller, comprising a controlling drum having series and parallel positions, a reversing switch, and a cut-out switch having three blades so connected and arranged that either motor can be cut out without interfering with the control of the other motor through all positions of the controlling drum.

18. A controller for two electric motors comprising a controlling switch having series and parallel positions, a reversing switch, and a single cut-out switch having a plurality of blades and connected and arranged to cut out either motor and at the same time complete connections whereby the other motor may be controlled through all positions of the controlling switch without danger to either motor.

19. A controller for a plurality of electric motors comprising a regulating switch having series and parallel positions, a reversing switch, and a cut-out switch operable only in its entirety and so constructed and connected that any single one of the motors may be cut out without interfering with the safe control of any other motor for all positions of the regulating switch.

20. In combination, two electric motors, a controlling switch therefor whereby the motors may be connected in series or in parallel, a reversing switch for the motors, and a single cut-out switch by means of which either motor may be cut out and the other motor so connected to the controlling switch that through all its positions the latter may control said other motor.

21. In combination, a motive apparatus comprising a plurality of motors, a regulating switch therefor, constructed and arranged to connect the motors in series and in parallel in its different positions, a switch for reversing the motors, and a unitary cut-out switch so connected and arranged that any single one of the motors may be disconnected while still permitting the regulating switch through all its positions to safely control the remaining motive apparatus.

22. A two motor controller comprising a regulating switch, a reversing switch, and a single cut-out switch so connected and arranged that either motor may be cut out while still permitting the regulating switch through all its positions to safely control the other motor.

23. A controller for a plurality of electric motors comprising a controlling switch, a reversing switch, and a cut-out switch operable only in its entirety and so connected and arranged that any single motor may be cut out without interfering with the control of any other motor through all positions of the controlling switch.

24. In combination, two electric motors, a controlling drum and a reversing switch therefor, and a unitary cut-out switch having a plurality of blades so connected and arranged that both motors may be connected or either motor disconnected and the controlling drum through all its positions control the motor or motors which are connected.

25. In combination, a plurality of electric motors, a plural bladed cut-out switch operable only in its entirety and so connected and arranged that all the motors may be connected or any single motor disconnected, and a controlling drum for the motors which through all its positions controls those motors which may be connected.

26. A controller for electric motors comprising a controlling switch for connecting two motors in series and parallel relation, a reversing switch, and a unitary cut-out switch so connected and arranged that it may disconnect either motor and complete connections whereby the other motor is under rheostatic control of the controller through all positions of the latter.

In testimony whereof I affix my signature, in the presence of two witnesses.

EMMETT W. STULL.

Witnesses:
  GEO. B. SCHLEY,
  FRED J. KINSEY.